(12) United States Patent
Corridori et al.

(10) Patent No.: US 12,038,387 B2
(45) Date of Patent: Jul. 16, 2024

(54) METHOD FOR THE IDENTIFICATION OF DEFECTS IN TRANSPARENT SLABS AND RELATED SYSTEM

(71) Applicant: DELTAMAX AUTOMAZIONE S.R.L., Trento (IT)

(72) Inventors: Chiara Corridori, Trento (IT); Matteo Devilli, Trento (IT); Leonardo Plotegher, Trento (IT)

(73) Assignee: DELTAMAX AUTOMAZIONE S.R.L., Trento (IT)

( * ) Notice: Subject to any disclaimer, the term of this patent is extended or adjusted under 35 U.S.C. 154(b) by 333 days.

(21) Appl. No.: 17/602,890

(22) PCT Filed: Apr. 9, 2020

(86) PCT No.: PCT/IB2020/053404
§ 371 (c)(1),
(2) Date: Oct. 11, 2021

(87) PCT Pub. No.: WO2020/208577
PCT Pub. Date: Oct. 15, 2020

(65) Prior Publication Data
US 2022/0163458 A1 May 26, 2022

(30) Foreign Application Priority Data
Apr. 10, 2019 (IT) .................. 102019000005568

(51) Int. Cl.
*G01N 21/896* (2006.01)
*G01N 21/88* (2006.01)

(52) U.S. Cl.
CPC ..... *G01N 21/896* (2013.01); *G01N 2021/8845* (2013.01)

(58) Field of Classification Search
CPC ... G01N 2021/8845; G01N 2021/8962; G01N 2021/9586; G01N 21/896; G01N 21/958
See application file for complete search history.

(56) References Cited

U.S. PATENT DOCUMENTS

| 7,292,332 B2 | 11/2007 | Gerstner et al. |
| 2004/0207839 A1* | 10/2004 | Gerstner .............. G01N 21/896 356/239.1 |
| 2015/0346107 A1 | 12/2015 | Kim |
| 2019/0047895 A1 | 2/2019 | Kuhn |

FOREIGN PATENT DOCUMENTS

| CN | 109283197 A | * | 1/2019 | |
| EP | 0 927 883 A1 | | 7/1999 | |
| KR | 2015 0140035 A | | 12/2015 | |
| WO | WO-2006057125 A1 | * | 6/2006 | .......... G01N 21/896 |

* cited by examiner

*Primary Examiner* — Peter B Kim
(74) *Attorney, Agent, or Firm* — ASLAN LAW, P.C.

(57) ABSTRACT

A method (and system) for the identification of defects in transparent slabs comprises at least the phases of supply of at least one transparent slab to be inspected; acquisition of at least one image of at least one portion of the slab along an acquisition line; identification of at least one defect in the slab depending on the acquired image; at least one emission phase of at least one light radiation transmitted inside the slab along an emission line substantially transverse to the acquisition line and adapted to be incident with at least one defect in the slab in order to identify the position thereof, the light radiation incident with the defect being diffused by the latter at least in part outside the slab.

11 Claims, 5 Drawing Sheets

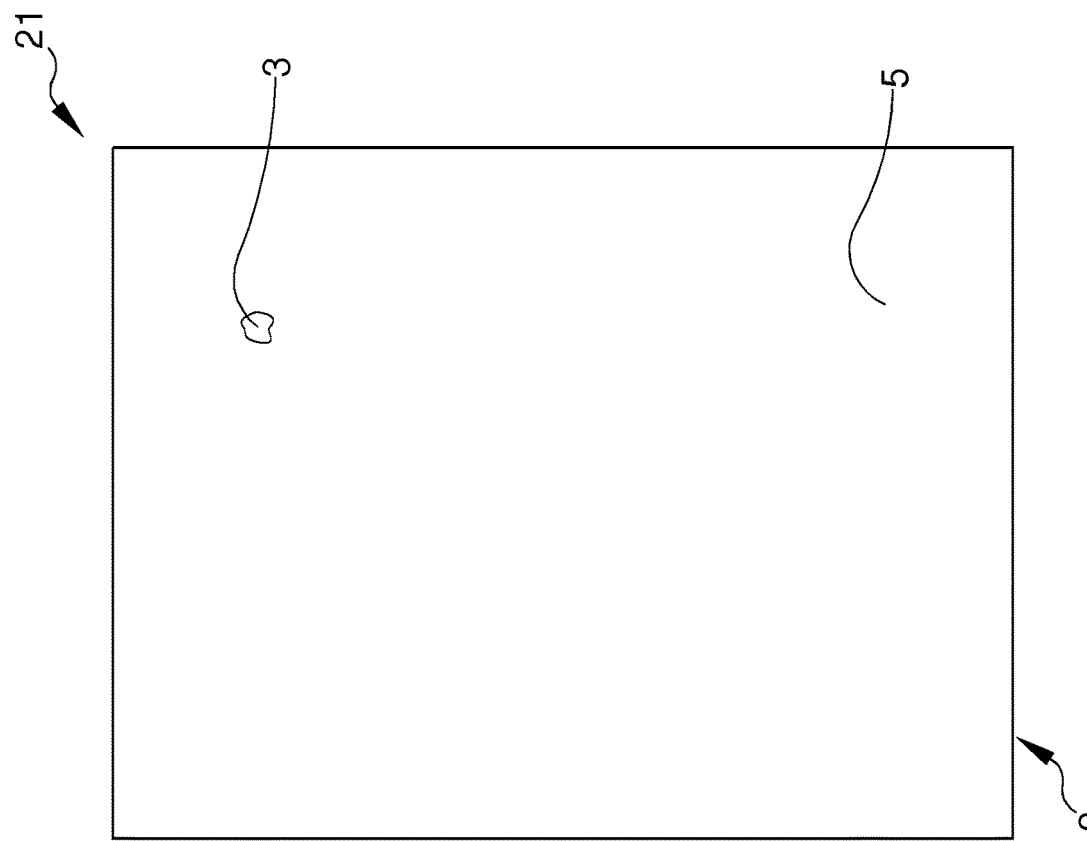
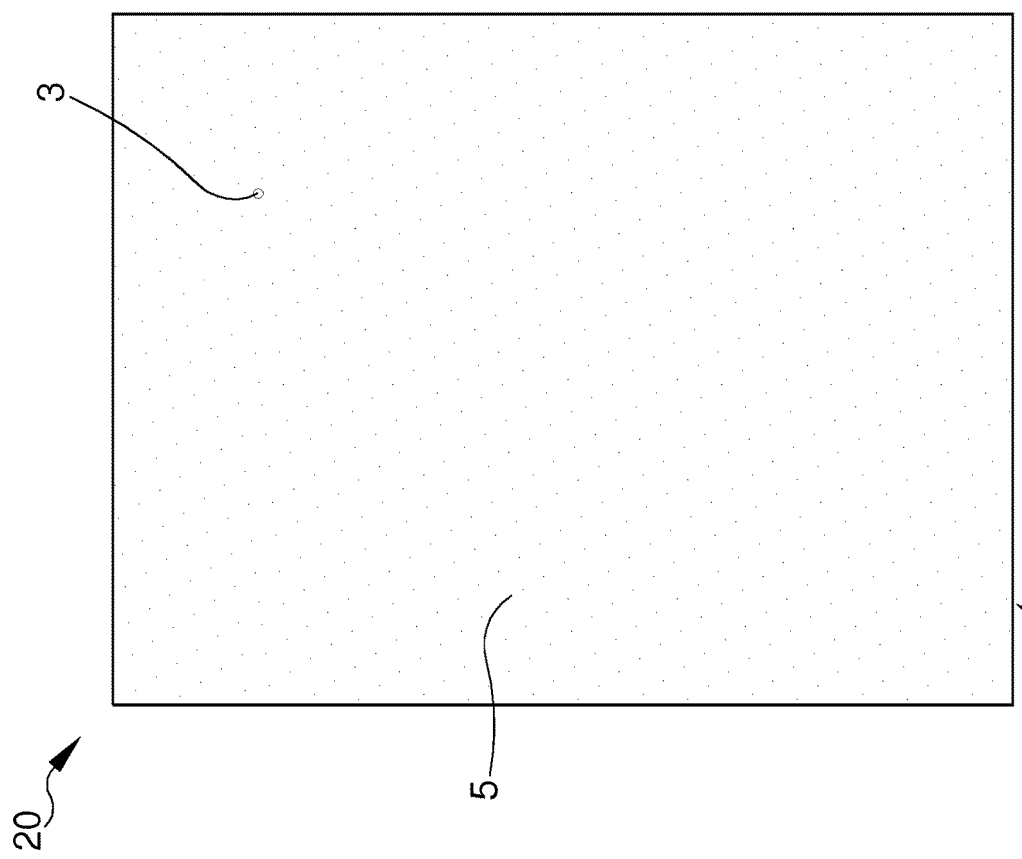

METHOD FOR THE IDENTIFICATION OF DEFECTS IN TRANSPARENT SLABS AND RELATED SYSTEM

CROSS-REFERENCE TO RELATED APPLICATIONS

This application claims priority to IT Patent Application No. 102019000005568 filed on Apr. 10, 2019, and this application claims priority to and is a 371 of international PCT Application No. PCT/IB2020/053404 filed on Apr. 9, 2020, the entire contents of which are hereby incorporated by reference.

TECHNICAL FIELD

The present invention relates to a method for the identification of defects in transparent slabs and related system.

BACKGROUND ART

Various methods are known for the identification of defects in transparent slabs used for the purpose of carrying out the quality control of the slabs produced.

Generally, the methods of known type are carried out by using special defect identification systems comprising slab image acquisition means and acquired image identification means configured to automatically identify any production defects on the slab, e.g. by performing machine vision processes, image processing and the like.

In addition, the systems of known type are generally provided with slab movement means which are adapted to place the slab in front of the acquisition means.

These devices allow known methods and the related systems to acquire particularly sharp images of the slab which, once processed, highlight any defects thereof.

The known methods and related systems do however have some drawbacks related to the high degree of uncertainty in identifying certain types of slab defects.

In fact, during the production and sales process of the slabs, these are frequently exposed to foreign bodies, generally of the corpuscular type, such as e.g. dust and/or processing waste, which are deposited on the slab and are taken by the methods and related systems of a known type as defects in the slabs themselves.

As a result, this type of methods and systems identify a large amount of false positives, i.e. false defects that are not actually imperfections of the slab, but are foreign bodies deposited thereon.

This drawback significantly slows down the execution of the methods of known type due to the frequent verification checks necessary to distinguish false positives from the real production defects of the slab, reflecting on the entire cost of execution of the entire method.

In order to solve this issue, the methods of known type provide for a washing phase of the slabs, which is carried out before their analysis.

This way, the foreign bodies deposited on the slab are almost completely eliminated, thus significantly reducing the risk of detecting false positives and the time required to perform the method.

However, the washing phase of the slabs does not reduce the execution costs of these methods due to some drawbacks related to the use of water and detergents needed to wash the slabs.

In fact, the systems of known type must provide for an additional drying phase of the washed slabs in order not to detect false positives due to possible water residues or marks remaining on the surface of the analysed slabs.

In addition, this type of method must provide by law for several disposal operations of the wastewater used to wash the slabs.

These operations make the known methods and the related systems particularly expensive without appreciably reducing the time needed to identify the defects.

DESCRIPTION OF THE INVENTION

The main aim of the present invention is to devise a method for the identification of defects in transparent slabs and a related system that allow significantly reducing the risk of detecting false positives without the need to wash the slabs prior to their analysis.

A further object of the present invention is to devise a method for the identification of defects in transparent slabs and a related system that allow considerably reducing the time required by the method to be carried out compared with those of known type.

Another object of the present invention is to devise a method for the identification of defects in transparent slabs and a related system that allow overcoming the above mentioned drawbacks of the prior art in a simple, rational, easy, effective to use and affordable solution.

The objects set out above are achieved by the present method having the characteristics of claim 1.

In addition, the objects set out above are achieved by the present system having the characteristics of claim 11.

BRIEF DESCRIPTION OF THE DRAWINGS

Other characteristics and advantages of the present invention will be more evident from the description of a preferred, but not exclusive, embodiment of a method for the identification of defects in transparent slabs and a related system, illustrated by way of an indicative, but not limiting example in the attached tables of drawings in which:

FIG. 4 is a schematic view of the graphical representation of the slab processed by the method according to the invention;

FIG. 5 is a schematic view of the graphic reproduction of the slab developed by the method according to the invention;

EMBODIMENTS OF THE INVENTION

Figure 1:
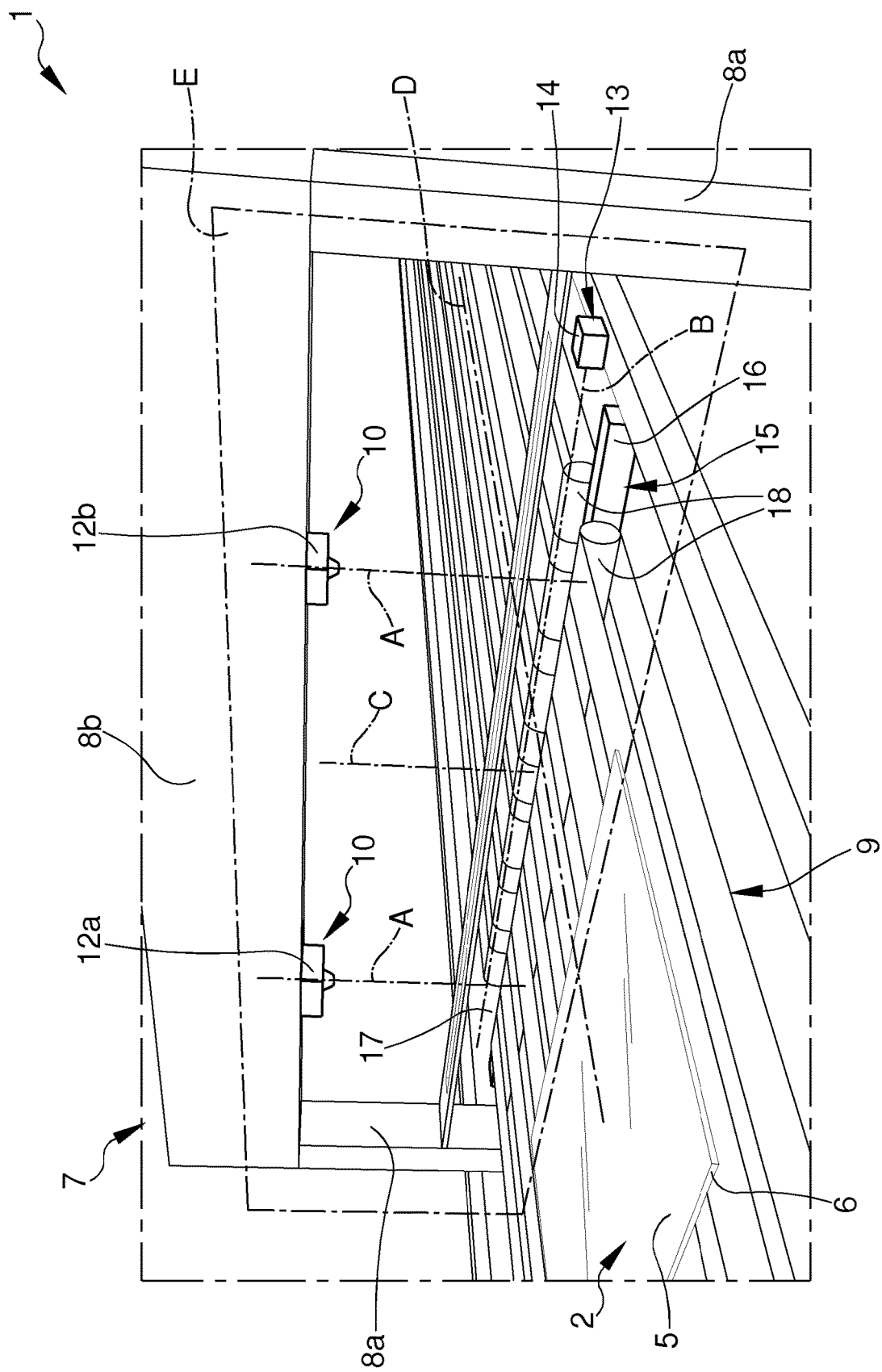
FIG. 1 is a schematic axonometric view of the system according to the invention.
Figure 2:
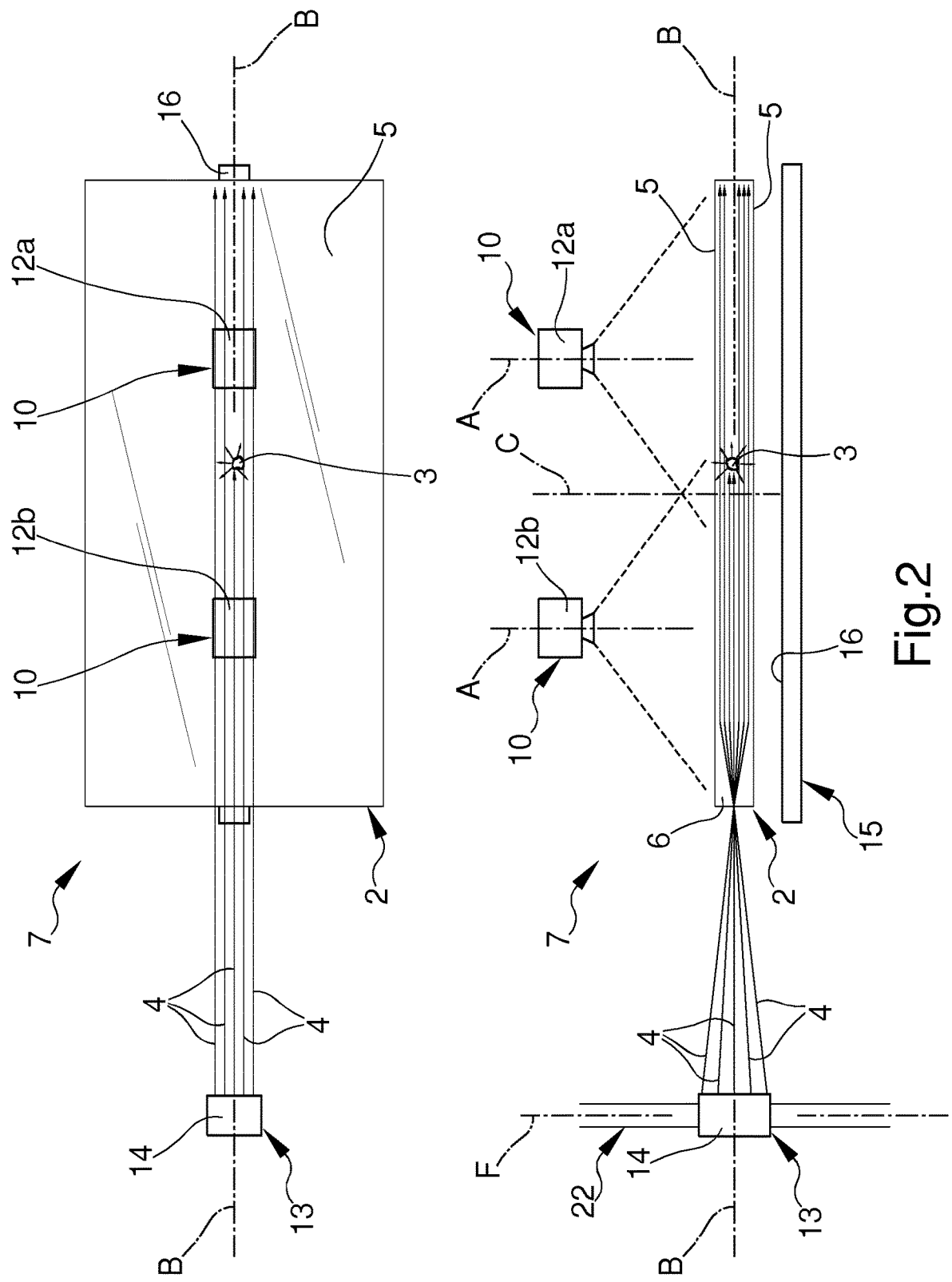
FIG. 2 is a schematic view of the emission phase of the method according to the invention.
Figure 3:
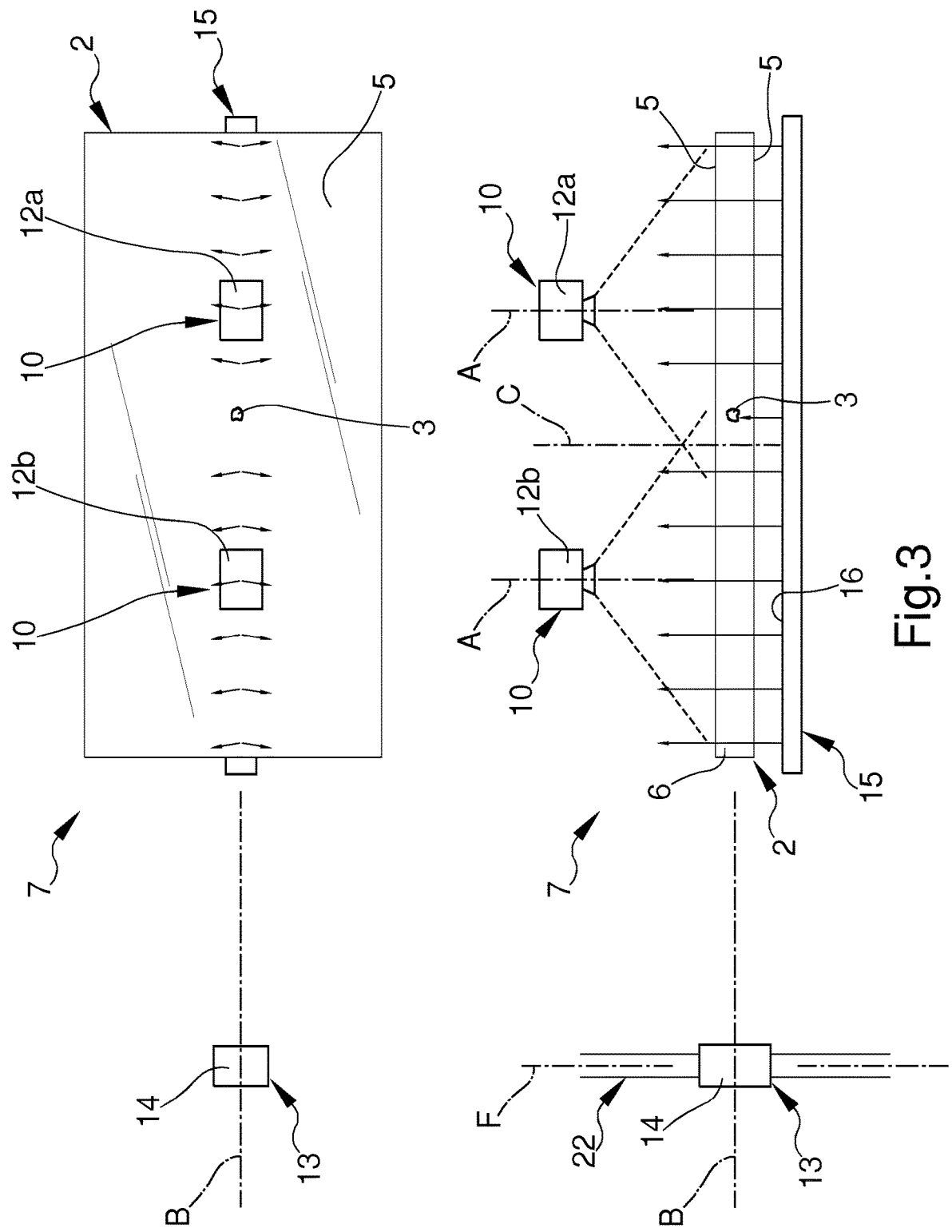
FIG. 3 is a schematic view of the lighting phase of the method according to the invention.

With particular reference to these figures, reference numeral 1 globally indicates a method for the identification of defects in transparent slabs.

The method 1 for the identification of defects in transparent slabs comprises at least the phases of:
  supply of at least one transparent slab 2 to be inspected;
  acquisition of at least one image of at least one portion of the slab 2 along an acquisition line A;
  identification of at least one defect 3 in the slab 2 depending on at least one acquired image.

Preferably, the slabs 2 inspected via the execution of the method 1 are made of glass material.

Alternative embodiments of the method 1, however, cannot be ruled out wherein the analysed slabs 2 are made of different transparent materials, e.g. Polymethylmethacrylate (Plexiglass) or other transparent, semi-transparent plastic materials.

Advantageously, the method 1 comprises at least one emission phase of at least one light radiation 4 transmitted inside the slab 2 along an emission line B substantially transverse to the acquisition line A and adapted to be incident with at least one defect 3 of the slab 2 so as to identify the position thereof.

Preferably, the light radiation 4 emitted inside the slab 2 is of the type of a one-way and collimated radiation, such as e.g. a laser radiation.

This way, the light radiation 4 emitted inside a slab 2 free of defects and/or imperfections is transmitted through the material of which it is made without undergoing any particular deflection with respect to the emission line B.

On the contrary, the light radiation 4 incident with the defect 3 is diffused by the latter at least in part outside the slab 2.

In fact, the defects 3 define structural irregularities of the material of which the slab 2 is made, such as e.g. bubbles, inclusions and the like, which represent an obstacle to the normal propagation of light which, being incident with the defect 3, is irregularly diffused around the space surrounding the defect itself.

Advantageously, this diffusion is particularly localized around the defect 3 indicating the position thereof. In fact, the transparent material of which the slab 2 is made, makes the sparkle generated by the diffusion of the light radiation 4 visually distinguishable from the outside of the slab itself.

Preferably, the slab 2 comprises at least one pair of faces 5 arranged parallel and opposite each other and defining the width and height of the slab 2, and at least one perimeter surface 6 placed between the faces 5 to define the thickness of the slab 2. In addition, the acquisition line A is incident with one of the faces 5, and the emission line B is incident with the perimeter surface 6 and substantially orthogonal to the acquisition line A.

Preferably, the slab 2 used for the execution of the method 1 is of the type of a slab 2 of substantially rectangular or square shape, the thickness of which is substantially smaller than the width and height thereof.

It cannot however be ruled out that the method 1 may be performed for slabs 2 having different conformation, e.g. of circular or irregular shape.

Conveniently, the acquisition phase is carried out at the same time as the emission phase.

This way, when a defect 3 is hit by the light radiation 4 emitted during the emission phase, the acquisition phase allows acquiring an image showing the sparkle generated by the diffusion of the light radiation 4 outside the slab 2 due to the defect 3.

In particular, as described above, at the point of diffusion of the light radiation 4, the latter generates a sparkle that is captured by the acquired image, uniquely identifying the position of the defect 3 on the slab 2.

The slab 2 comprises a plurality of layers 2a to be inspected, arranged overlapping each other to define each at least one lateral portion 6a of the perimeter surface 6.

Figure 6:
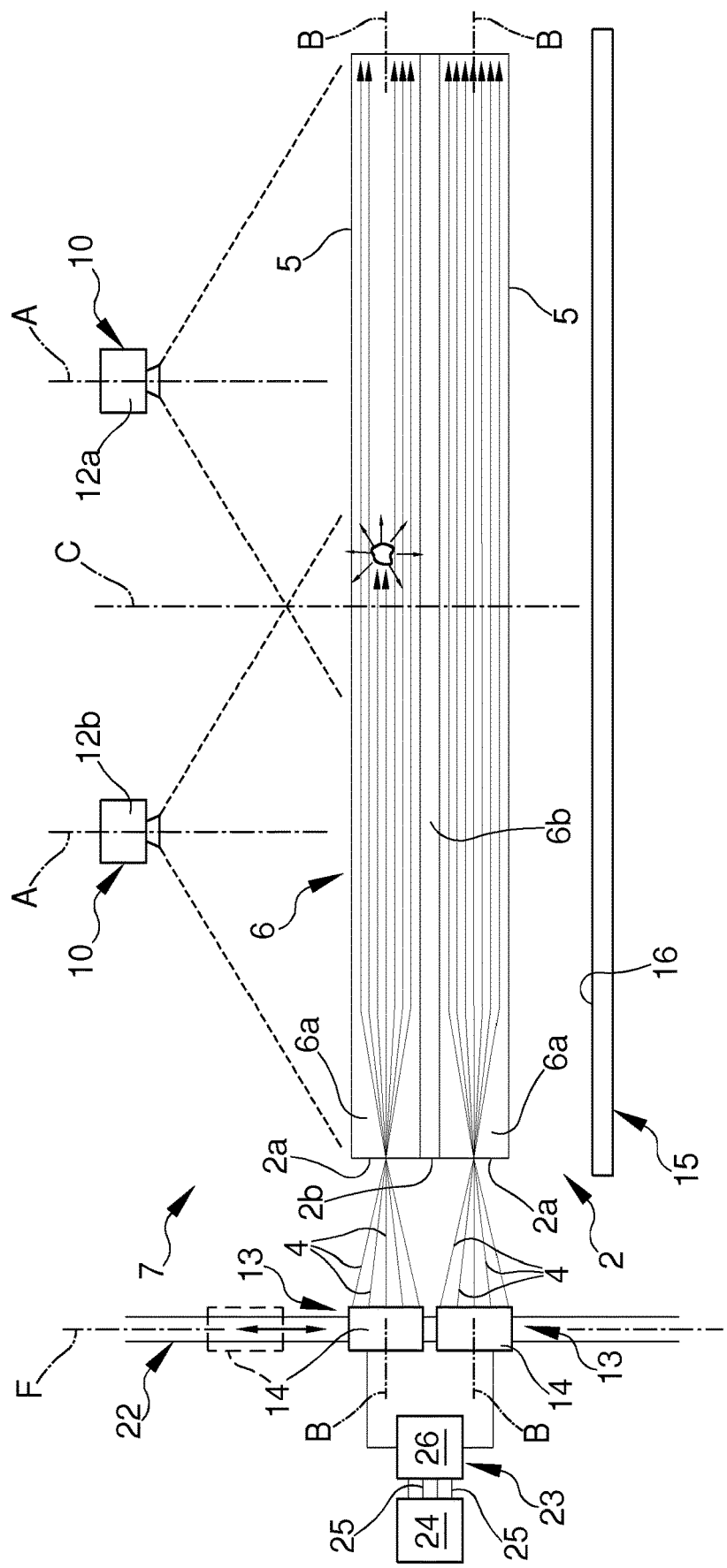
FIG. 6 is a schematic view of a further embodiment of the emission phase according to the invention.

In addition, the slab 2 comprises at least one reinforcement layer 2b placed between the layers 2a in a sandwich-like fashion, as shown in FIG. 6.

Preferably, the layers 2a are made of glass material, while the reinforcement layer 2b is made, e.g., of PVC or similar materials, to make laminated or composite glass, such as, e.g., the safety glasses.

Conveniently, the emission phase comprises a plurality of emission steps of the light radiation 4 incident with a corresponding lateral portion 6a and adapted to be incident with at least one defect 3 of a corresponding layer 2a.

With particular reference to FIG. 6, the slab 2 comprises two layers 2a between which a reinforcement layer 2b is placed.

Therefore, the emission phase comprises two emission steps. A first emission step emits the light radiation 4 inside a layer 2a through the corresponding lateral portion 6a. A second emission step, on the other hand, emits the light radiation 4 inside the other layer 2a through the corresponding lateral portion 6a.

The use of slabs 2 having a greater number of layers 2a and of reinforcement layers 2b cannot however be ruled out, such as, e.g., three layers 2a and two reinforcement layers 2b, for example to make armoured glasses.

In fact, further embodiments of the method cannot be ruled out, wherein the emission phase comprises a greater number of emission steps depending on the number of layers 2a of the slab 2.

Advantageously, the emission phase comprises a splitting step of at least one light beam 25 into the light radiations 4 emitted during the emission steps.

Advantageously, the method 1 comprises at least one lighting phase of at least one portion of a face 5 of the slab 2.

Preferably, the lighting phase consists in illuminating at least one portion of the face 5 along a lighting line C.

In addition, the lighting phase consists in backlighting the slab 2, i.e. illuminating the face 5 of the slab 2 opposite that of which the image has been captured.

Advantageously, the lighting line C is substantially parallel to the acquisition line A.

In addition, the illumination propagates through the slab 2, crossing it from face 5 to face 5.

Such device makes it possible to illuminate any defect 3 of the slab 2 regardless of the position of the defect 3 inside the slab itself.

In addition, the acquisition phase is carried out at the same time as the lighting phase.

This way, as described with reference to the emission phase, whenever the slab 2 is backlit, an acquisition phase of at least one image is carried out.

Advantageously, the lighting phase consists in illuminating the slab 2 along the lighting line C starting from the face 5 opposite the face 5 of which the image is acquired.

According to the invention, the emission phase and the lighting phase allow acquiring, respectively, at least a first image of the slab 2 involved with the light radiation 4, wherein the positions of one or more defects 3 are highlighted, and at least a second image of the backlit slab 2, wherein the conformation and/or shape of the defects 3 is highlighted.

This way, by means of the first image, the method 1 makes it possible to precisely identify the position of the defects 3, distinguishing these from any foreign bodies on the faces 5 of the slab 2.

On the other hand, using the second image, the method 1 makes it possible to precisely identify the conformation and/or size of the defects 3, the position of which was previously identified using the first image.

Advantageously, the emission phase and the lighting phase make it possible to acquire a plurality of first images, each relating to a layer 2*a*. Therefore, in the continuation of this discussion, what has been described about the first image with reference to the slab 2 must be considered valid for each first image with reference to the corresponding layer 2*a*. Conveniently, the method 1 comprises at least one movement phase of the slab 2 by a predefined forward movement distance along a work line D.

In particular, the method 1 comprises repeating the movement phase. In addition, after each movement phase, one of the emission phase and the lighting phase is carried out alternately.

For example, whenever the slab 2 moves forward by an even multiple of the forward movement distance, the method 1 provides for carrying out an emission phase, and whenever the slab 2 moves forward by an odd multiple of the forward movement distance, the method 1 provides for a lighting phase.

Alternative embodiments of the method 1 cannot however be ruled out, wherein, on the contrary, whenever the slab 2 moves forward by an odd multiple of the forward movement distance, the method 1 provides for carrying out an emission phase, and whenever the slab 2 moves forward by an even multiple of the forward movement distance, the method 1 provides for carrying out a lighting phase.

Furthermore, alternative embodiments of the method 1 cannot be ruled out wherein the emission phase, the lighting phase and the acquisition phase are carried at the same time.

For example, it cannot be ruled out that after each movement phase, the emission phase, the lighting phase and the acquisition phase of the first and of the second image are carried out at the same time.

Advantageously, the acquisition phase consists in acquiring an image of a limited portion of the slab 2, i.e. only of the portion crossed by the light radiation 4 emitted along the emission line B or of the illuminated portion along the lighting line C.

In particular, the acquisition phase consists in acquiring an image of a portion of the face 5 of the slab 2.

Consequently, according to the invention, the movement phase is repeated until at least one image of each portion of the face 5 of the slab 2 is obtained.

This way, the identification phase allows the entirety of the face 5 to be analysed and all the defects 3 of the slab 2 to be identified.

Advantageously, the identification phase comprises at least the steps of:
processing at least one graphic representation 20 of the slab 2 depending on of the images acquired during the emission phase;
finding out the position of at least one defect 3 on the slab 2 depending on the processed graphic representation 20.

Preferably, the processing step consists in processing a graphic representation 20 created by combining all the images acquired during the emission phase, in order to create a single image representing the entirety of the slab 2.

In other words, the image created this way represents an image of the slab 2 wherein the same is crossed throughout its entire extension by the light radiation 4.

In particular, the graphic representation 20 represents the entirety of the face 5 of the slab 2 of which the images are acquired.

Conveniently, the identification phase consists in identifying the points at which the graphic representation 20 shows a sparkle, i.e. wherein the light radiation 4 is diffused.

In particular, in the event of the slab 2 not presenting any defect, the processed graphic representation 20 does not show any sparkle and the light radiation 4 is not captured by the acquired images.

Conveniently, the identification phase comprises at least the steps of:
developing at least one graphic reproduction 21 of the slab 2 depending on the images acquired during the lighting phase;
determining at least one defect feature selected from the list comprising:
length, width, area, density, position, orientation, transparency/opacity.

Similarly to what has been previously described with reference to the processing step, the development step provides for processing a graphic reproduction 21 created by the combination of all the images acquired during the lighting phase, in order to create a single image representing the entirety of the slab 2.

In other words, the image created this way represents a complete image of the slab 2 in which the same is illuminated throughout its entire extension, so as to highlight certain characteristics of any identified defects 3, such as e.g. their size.

In particular, the graphic reproduction 21 represents the entirety of the face 5 of the slab 2, the images of which are acquired.

Conveniently, the determination step consists in identifying the points at which the graphic reproduction 21 shows a distortion and/or an anomaly in the lighting, such as e.g. as an attenuation of the light intensity, caused by the presence of a defect 3. Preferably, according to a possible embodiment of the method 1, the identification phase consists in a storage step of the positions of the identified defects 3. This way, the determination step is carried out at the identified points.

Advantageously, the determination step comprises at least one intermediate step for the comparison of the determined size with at least one predetermined reference size.

In addition, the identification phase comprises at least one defect reporting step carried out when the determined size of the defect 3 is greater than or equal to the reference size.

Further embodiments of the method 1 cannot however be ruled out, wherein the identification phase comprises:
a step of locating the position of at least one defect 3 on the slab 2 depending on the graphic reproduction 21 developed;
a step of storing the positions of the detected defects 3;
a step of comparison between the positions located depending on the graphic representation 20 and the positions located depending on the graphic reproduction 21.

This way, it is possible to distinguish the defects detected by both the graphic reproduction 21 and the graphic representation 20 from those detected by only one of the latter.

A system 7 for the implementation of the method 1 according to the invention is described below.

The system 7 for the identification of defects in transparent slabs comprises:
at least one basic frame 8*a*, 8*b*;
acquisition means 10 mounted on the basic frame 8*a*, 8*b* and configured to acquire, along an acquisition line A, at least one image of at least one portion of at least one slab 2 moved along a work line D by the movement means 9;
identification means for identifying at least one defect 3 in the slab 2, operationally connected to the acquisition means 10 and configured to identify at least one defect 3 in the slab 2 depending on at least one image acquired by the acquisition means 10.

Preferably, the movement means 9 are adapted to move the slab 2 substantially horizontal and parallel to the ground, as shown in FIG. 1.

Preferably, the basic frame 8a, 8b comprises at least one pair of holding supports 8a on a stable surface arranged laterally to the movement means 9, and at least one suspended support 8b associated with the holding supports 8a and arranged suspended above the movement means 9, as shown in FIG. 1.

In particular, in the following discussion, the words "above", "below" and "next to", used as spatial indications of the mutual arrangement of one or more components of the system 7, are to be considered valid in the configuration of normal use of the system 7 shown in FIG. 1, wherein the basic frame 8a, 8b is placed resting on the ground and where the aforementioned words indicate the relative height of one or more components measured in relation to the ground.

Advantageously, the basic frame 8a, 8b can be mounted with a wide variety of movement means 9 of the type known to an expert in the field, such as belt, roller, tape conveyors and the like.

Furthermore, alternative embodiments of the system 7 cannot be ruled out wherein the movement means 9 are adapted to move the slab 2 while keeping it substantially vertical.

Conveniently, the acquisition means 10 are associated with the bridge structure 8b of the basic frame 8a, 8b and are arranged suspended above the movement means 9, so as to be turned, in use, towards the slab 2 moved by the movement means 9. In addition, preferably, the acquisition line A is arranged, in use, substantially orthogonal to the slab 2.

Preferably, the acquisition means 10 are substantially facing the ground.

Advantageously, the acquisition means 10 comprise at least one acquisition device 12a, 12b configured to acquire the image along the acquisition line A.

Preferably, the acquisition means 10 comprise a plurality of acquisition devices 12a, 12b arranged side by side along a deployment line which is arranged substantially orthogonal with respect to the work line D.

In particular, the acquisition means 10 acquire an image of a surface having a size substantially greater or equal to the width of the movement means 9, i.e. to the extension of the latter along a direction substantially orthogonal with respect to the work line D.

This way, the image acquired by the acquisition means 10 represents the entire portion of the slab 2 arranged resting on the movement means 9 along a lying line substantially parallel to the deployment line.

In addition, the acquisition devices 12a, 12b are preferably of the type selected from the list comprising cameras, smart cameras, CMOS linear sensors and the like.

Advantageously, the acquisition means 10 are configured to carry out the acquisition phase described above with reference to the method 1 according to the invention.

Advantageously, the system 7 comprises emission means 13 configured to emit at least one light radiation 4 along an emission line B substantially transverse to the acquisition line A and adapted to be incident with at least one defect 3 of the slab 2 so as to detect the position thereof.

In particular, the light radiation 4 incident with the defect 3 is diffused by the latter at least in part outside the slab 2.

Preferably, the emission means 13 are mounted on at least one of either the holding supports 8a of the basic frame 8a, 8b substantially at the same height as the movement means 9.

This way, the emission means 13 are arranged, in use, laterally to the slab 2 moved along the work line D by the movement means 9.

Alternative embodiments of the system 7 cannot be ruled out wherein the emission means are mounted on the movement means 9.

Advantageously, the slab 2 comprises:
at least one pair of faces 5 arranged parallel and opposite each other and defining the width and the height of the slab 2; and
at least one perimeter surface 6 positioned between the faces 5 to define the thickness of the slab 2.

In particular, the perimeter surface 6 is provided with four flat edges arranged parallel two by two and opposite each other and associated substantially orthogonal with each other to create a perimeter surface 6 of substantially rectangular shape. On the other hand, the faces 5 are substantially flat, substantially rectangular in shape and associated substantially orthogonal with the flat edges to form the slab 2.

Advantageously, the emission means 13 are mounted on the movement means 9. In particular, the emission means 13 are arranged, in use, facing the perimeter surface 6 of the slab 2.

On the other hand, the acquisition means 10 are arranged, in use, facing one face 5 of the slab 2.

More in detail, the acquisition line A is substantially orthogonal to the emission line B.

The slab 2 comprises a plurality of layers 2a to be inspected, arranged overlapping each other to define each at least one lateral portion 6a of the perimeter surface 6.

In addition, the slab 2 comprises at least one reinforcement layer 2b placed between the layers 2a in a sandwich-like fashion.

Advantageously, the emission means 13 comprise at least one emission source 14 positioned facing one of the lateral portions 6a and configured to emit a corresponding light radiation 4 adapted to be incident with at least one defect 3 of the corresponding layer 2a.

In addition, the emission means 13 comprise displacement means 22 of the emission source 14 along at least one direction of displacement F.

In particular, the displacement means 22 are adapted to place the emission source 14 facing at least one of the lateral portions 6a.

This way, the system 7 is configured to inspect each layer 2a by means of the sequential displacement of the emission source 14 at each lateral portion 6a.

Conveniently, the emission means 13 comprise a plurality of emission sources 14, each of which is arranged facing a corresponding lateral portion 6a and is configured to emit a corresponding light radiation 4.

In particular, the displacement means 22 are adapted to move an emission source 14 at one of the lateral portions 6a.

With particular reference to FIG. 6, the slab 2 comprises two layers 2a between which a reinforcement layer 2b is positioned.

Therefore, according to a possible embodiment of the system 7, the emission means comprise a fixed emission source 14 and an emission source 14 made movable by the displacement means 22.

Further embodiments of the method cannot, however, be ruled out, wherein the emission means comprise a larger number of emission sources 14 depending on the number of layers 2a of the slab 2.

Furthermore, it cannot be ruled out that the displacement means 22 are adapted to move a plurality of emission sources 14 along the direction of displacement F.

Preferably, the emission source(s) 14 are of the type of an electronic device selected from the list comprising: laser, LED, fiber optic illuminators, fluorescent lamps, halogen lamps, arc lamps and incandescent light bulbs.

Alternative embodiments of the system 7 cannot however be ruled out wherein the emission means 13 comprise:
- at least one emitting device 24 operationally connected to the emission sources 14 and configured to emit at least one light beam 25;
- at least one transmission device 23 placed between the emitting device 24 and the emission sources 14 and configured to transmit at least part of said light beam 25 to at least one of said emission sources 14, defining said light radiation 4.

Preferably, in this embodiment, the emitting device 24 is of the type selected from the list comprising: laser, LED, fiber optic illuminators, fluorescent lamps, halogen lamps, arc lamps and incandescent light bulbs. Instead, the emission source 14 is of the type of an optical guide operationally connected to the transmission device 23 and configured to guide the light radiation 4.

Advantageously, the transmission device 23 comprises at least one splitter 26 configured to split the light beam 25 into a plurality of light radiations 4 emitted by each emission source 14. Therefore, the light radiation 4 is a fraction of the light beam 25.

This way, the emission sources 14 simultaneously emit the light radiation 4.

Further embodiments of the emission means 13 cannot however be ruled out wherein the transmission device 23 comprises a selector, not shown in the figures, defining a plurality of predetermined routes, each adapted to transmit the light beam 25 to a corresponding emission source 14.

In addition, in this embodiment, the optical device is configured to select at least one of the predetermined routes so as to transmit the light beam 25 to at least one emission source 14, which introduces this light beam 25 into a corresponding layer 2a.

Appropriately, in this embodiment, the light beam 25 coincides with the light radiation 4.

Further embodiments of the emission means 13 cannot however be ruled out wherein the optical device comprises the splitter 26 and the selector. This way, the transmission device 23 is configured to select one or more predetermined routes along which to transmit a part of the light beam 25, wherein this part of the light beam 25 depends on the number of selected predetermined routes.

According to a further possible embodiment of the system 7, the emission means 13 are without the displacement means 22 and comprise a plurality of fixed emission sources 14.

Preferably, the emission means 13 are mounted on the movement means 9.

In addition, the system 7 preferably comprises a pair of emission means 13 arranged opposite each other to be placed, in use, alongside the slab 2 on opposite sides.

Furthermore, additional embodiments of the system 7 cannot be ruled out, wherein the same comprises a plurality of emission means 13 arranged side by side along a line of arrangement substantially parallel to the work line D. This way, according to this embodiment, the system 7 comprises a first group of emission means 13 arranged laterally along a first side of the movement means 9, and a second group of emission means 13 arranged laterally along a second side of the movement means 9 arranged substantially opposite and parallel to the first side.

With particular reference to the embodiment of the system 7 shown in the figures, the slab 2 is placed resting on the movement means 9 so as to arrange a pair of flat edges to extend substantially parallel to the work line D, and the other pair of flat edges to extend substantially orthogonal to the work line D, as shown in FIG. 1.

It cannot however be ruled out that the system 7 can be used for the identification of defects in slabs with different conformations.

In fact, any transparent slab arranged resting on the movement means 9 can be analyzed by the system 7 or by the method 1.

Conveniently, the system 7 comprises lighting means 15 arranged in front of the acquisition means 10 and adapted to illuminate the slab 2 along a lighting line C.

Preferably, the basic frame 8a, 8b comprises a supporting crosspiece associated with the holding supports 8a and placed below the movement means 9.

In addition, the lighting means 15 are associated with the supporting crosspiece and face, in use, the slab 2 moved along the work line D by the movement means 9.

Advantageously, the lighting means 15 define a lighting window 17 of a portion of the slab 2 transiting along the movement means 9.

Advantageously, the lighting means 15 comprise at least one illuminating device 16 of the type selected from the list comprising: laser, LED, fiber optic illuminators, fluorescent lamps, halogen lamps, arc lamps and incandescent light bulbs.

Preferably, the lighting means 15 comprise a plurality of illuminating devices 16 arranged side by side along a sorting line arranged substantially orthogonal with respect to the work line D and substantially parallel to the deployment line.

Advantageously, the lighting means 15 are configured to perform the lighting phase described above with reference to the method 1 according to the invention.

In particular, the lighting means 15 extend along the sorting line by a distance substantially greater than or equal to the width of the movement means 9.

This way, the lighting means 15 illuminate the entire portion of the slab 2 facing the lighting window 17.

In particular, the acquisition means 10, the emission means 13 and the lighting means 15 lie substantially on a lying plane E substantially orthogonal to the work line D.

In fact, the light radiation 4 emitted by the emission means 13 and the illumination carried out by the lighting means 15 substantially affect the same volume of the slab 2, i.e. the portion of the slab 2 placed at the point where the lighting window 17 is located.

In addition, the acquisition means 10 are configured to acquire an image of the portion of the face 5 corresponding to the volume affected by the light radiation 4 and by the illumination.

In other words, the image acquired by the acquisition means 10 represents only a longitudinal portion of the face 5 corresponding to the volume affected by the light radiation 4 and by the illumination, i.e. a portion of the face 5 that extends along a development line substantially orthogonal to the work line D.

Advantageously, the identification means comprise processing means of at least one graphic representation 20, 21 of the slab 2 depending on at least one image acquired by the acquisition means 10.

Preferably the identification means, not shown in the figures, are of the type selected from the list comprising: PC, Smart cameras, FPGA (Field Programmable Gate Array).

In particular, the processing means comprise at least one memory unit configured to store the images acquired by the acquisition means 10.

In fact, as described with reference to the method 1 according to the invention, the acquisition means 10 are configured to acquire a plurality of images of the slab 2, wherein each of the acquired images represents a different portion of the face 5 facing the acquisition means 10.

In particular, these portions of the face 5 are arranged at the acquisition line A by the movement means 9.

In fact, the movement means 9 are designed to carry out the movement phase described above with reference to the method 1 according to the invention.

In addition, following the acquisition of the images of each portion of the face 5 of the slab 2, the processing means are configured to carry out the processing step and the development step.

In other words, the processing means are configured to process the graphic representation 20, 21, i.e. the graphic representation 20 and the graphic reproduction 21.

This way, the identification means are configured to identify at least one of the position or the size of the defect 3 depending on the graphic representation 20, 21.

In fact, the identification means are configured to perform the identification and determination step described above with reference to the method 1 according to the invention.

Advantageously, the emission means 13 are configured to emit the light radiation 4 having at least a first predefined wavelength.

In addition, the lighting means 15 are configured to emit at least one light flux having at least a second predefined wavelength different from the first predefined wavelength.

Advantageously, the acquisition means 10 comprise at least a first acquisition device 12a configured to detect the first predefined wavelength and at least a second acquisition device 12b configured to detect the second wavelength.

This way, the emission means 13 and the lighting means 15 can simultaneously emit the light radiation 4 and the light flux. Consequently, the first acquisition device 12a and the second device 12b can acquire, respectively and at the same time, a first image, wherein is shown the effect on the slab 2 of only one of the light radiation 4 and the light flux is filtered, and a second image, wherein is shown the effect on the slab 2 of only the other of the light radiation 4 and the light flux.

In particular, the first device 12a is provided with a first filter configured to exclude from the first image one of the light radiation 4 and the light flux, and the second device 12b is provided with a second filter configured to exclude from the second image the other of the light radiation 4 and the light flux.

This way, the system 7 is configured to simultaneously perform the emission phase, the lighting phase and the acquisition phase described above with reference to the method 1 according to the invention.

It has in practice been found that the described invention achieves the intended objects.

In particular, the emission phase and the emission means allow, respectively, the method and the system for the identification of defects to significantly reduce the risk of identifying false positives without the need to wash the slabs prior to their analysis; they also allow, in particular, reducing the execution time of the method compared to those of known type.

In addition, the emission means make it possible to identify the defects in the multilayer slabs, i.e. slabs that alternate layers, e.g. glass, with reinforcement layers, such as e.g. PVC. In fact, the reinforcement layers prevent the propagation of the light radiation, used by the emission sources, between different layers. Therefore, by means of the displacement means and/or a plurality of emission sources, the emission means allow each layer to be inspected independently of the others.

The invention claimed is:

1. A method for the identification of defects in transparent slabs, the method comprising at least the steps of:
   supply of at least one transparent slab to be inspected;
   acquisition of at least one image of at least one portion of said slab along an acquisition line;
   identification of at least one defect in said slab depending on said at least one acquired image, wherein
   a plurality of emission steps of at least one light radiation transmitted inside said slab along an emission line substantially perpendicular to said acquisition line and adapted to be incident with at least one defect in said slab to identify the position thereof, said light radiation incident with said defect being diffused by the latter at least in part outside said slab,
   said slab comprises at least one pair of faces arranged parallel and opposite each other and defining the width and height of said slab, and at least one perimeter surface placed between said faces to define the thickness of said slab,
   said acquisition line is incident to one of faces, and
   said emission line is incident to said perimeter surface and substantially orthogonal to said acquisition line;
   said method comprising a plurality of lighting steps of at least one portion of one face of said slab along a lighting line, wherein
   said lighting line is substantially parallel to said acquisition line;
   said method comprising at least one movement step of said slab by a predefined forward movement distance along a work line, and
   said identification step comprises at least the steps of:
      processing at least one graphic representation of said slab depending on said images acquired during said emission step;
      finding out the position of at least one defect on said slab depending on said processed graphic representation;
      developing at least one graphic reproduction of said slab depending on said images acquired during said lighting step; and
      determining the size of at least one defect on said slab depending on said developed graphic reproduction.

2. The method according to claim 1, wherein
   said slab comprises a plurality of layers to be inspected, arranged overlapping each other to define each at least one lateral portion of said perimeter surface and at least one reinforcement layer placed between said layers, and
   said emission step comprises a plurality of emission steps of said light radiation incident to a corresponding of said lateral portion and adapted to be incident with at least one defect of a corresponding layer.

3. The method according to claim 1, wherein
said emission step comprises a splitting step of at least one light beam in said light radiations emitted during said emission steps.

4. The method according to claim 1, wherein
said acquisition step is carried out at the same time as said emission step.

5. The method according to claim 1, wherein the repetition of said movement step and after each movement step, one of said emission step and said lighting step is carried out alternately.

6. A system for the identification of defects in transparent slabs, the system comprising:
at least one basic frame;
acquisition means mounted on said basic frame and configured to acquire along an acquisition line at least one image of at least one portion of at least one slab moved along a work line by movement means;
identification means for identifying at least one defect in said slab, operationally connected to said acquisition means and configured to identify at least one defect in said slab depending on at least one image acquired by said acquisition means;
emission means of at least one light radiation along an emission line substantially perpendicular to said acquisition line and adapted to be incident with at least one defect in said slab to identify the position thereof, said light radiation incident with said defect being diffused by the latter at least in part outside said slab, wherein
said slab comprises:
at least one pair of faces arranged parallel and opposite each other and defining the width and the height of said slab; and
at least one perimeter surface positioned between said faces to define the thickness of said slab;
said emission means are arranged, in use, facing said perimeter surface;
said acquisition means are arranged, in use, facing said face;
said acquisition line is substantially orthogonal to said emission line;
said system comprising lighting means arranged in front of said acquisition means and adapted to illuminate said slab along lighting line substantially parallel to said acquisition line, wherein
said acquisition means are configured to acquire a plurality of images of said slab,
each of the acquired images represents a different portion of said face facing said acquisition means;
said identification means comprise processing means of at least one graphic representation and at least one graphic reproduction of said slab depending on the plurality of images acquired by said acquisition means; and
said identification means are configured to identity the position and the size of said defect depending on said graphic representation and said graphic reproduction.

7. The system according to claim 6, wherein
said slab comprises a plurality of layers to be inspected, arranged overlapping each other to define each at least one lateral portion of said perimeter surface, and at least one reinforcement layer placed between said layers, and
said emission means comprise at least one emission source positioned facing one of said lateral portions and configured to emit a corresponding light radiation adapted to be incident with at least one defect of the corresponding layer.

8. The system according to claim 7 wherein
said emission means comprise displacement means of said emission source along at least one direction of displacement, said displacement means being adapted to place said emission source facing at least one of said lateral portions.

9. The system according to claim 6, wherein
said emission means comprise a plurality of said emission sources, each of which is positioned facing a corresponding lateral portions and is configured to emit a corresponding light radiation.

10. The system according to claim 6, wherein said emission means comprise:
at least one emitting device operationally connected to said emission sources and configured to emit at least one light beam, and
at least one transmission device placed between said emitting device and said emission sources, and configured to transmit at least part of said light beam to at least one of said emission sources, defining said light radiation.

11. The system according to claim 6, wherein
said emission means are configured to emit said light radiation having at least a first predefined wavelength;
said lighting means are configured to emit at least one light flux having at least a second predefined wavelength different from said first predefined wavelength, and
said acquisition means comprise at least a first acquisition device configured to detect said first predefined wavelength and at least a second acquisition device configured to detect said second wavelength.

* * * * *